United States Patent
Samuthirapandian et al.

(10) Patent No.: US 8,831,796 B2
(45) Date of Patent: Sep. 9, 2014

(54) SYSTEM AND METHOD FOR INDICATING A PERSPECTIVE COCKPIT FIELD-OF-VIEW ON A VERTICAL SITUATION DISPLAY

(75) Inventors: Subash Samuthirapandian, Tamilnadu (IN); Saravanakumar Gurusamy, Tamil Nadu (IN); Anup Raje, Karnataka (IN); Ivan Sandy Wyatt, Scottsdale, AZ (US); Rob Odgers, Litchfield Park, AZ (US); Fazurudheen A, Tamilnadu (IN)

(73) Assignee: Honeywell International Inc., Morristown, NJ (US)

( * ) Notice: Subject to any disclaimer, the term of this patent is extended or adjusted under 35 U.S.C. 154(b) by 138 days.

(21) Appl. No.: 13/345,291

(22) Filed: Jan. 6, 2012

(65) Prior Publication Data
US 2013/0179010 A1   Jul. 11, 2013

(51) Int. Cl.
*G05D 1/00* (2006.01)
*G01C 1/00* (2006.01)
*G01C 21/00* (2006.01)
*G01C 23/00* (2006.01)

(52) U.S. Cl.
USPC ............ 701/4; 340/973; 701/3; 701/14

(58) Field of Classification Search
CPC .... G01C 23/00; G01C 23/005; G08G 5/0021; G08G 5/0086
USPC ............ 701/4, 3, 14; 340/971, 973, 974, 977
See application file for complete search history.

(56) References Cited

U.S. PATENT DOCUMENTS

| | | | |
|---|---|---|---|
| 6,879,886 B2 | 4/2005 | Wilkins, Jr. et al. | |
| 6,995,690 B1* | 2/2006 | Chen et al. | 340/974 |
| 7,010,398 B2* | 3/2006 | Wilkins et al. | 701/3 |
| 7,098,809 B2* | 8/2006 | Feyereisen et al. | 340/963 |
| 7,148,861 B2 | 12/2006 | Yelton et al. | |
| 7,256,710 B2 | 8/2007 | Mumaw et al. | |
| 7,312,725 B2 | 12/2007 | Berson et al. | |
| 7,619,626 B2 | 11/2009 | Bernier | |
| 7,783,393 B2* | 8/2010 | Tucker et al. | 701/4 |
| 7,940,196 B2* | 5/2011 | Wyatt et al. | 340/973 |
| 2003/0132860 A1 | 7/2003 | Feyereisen et al. | |
| 2003/0222887 A1* | 12/2003 | Wilkins et al. | 345/618 |
| 2004/0160341 A1* | 8/2004 | Feyereisen et al. | 340/970 |
| 2006/0004496 A1* | 1/2006 | Tucker et al. | 701/4 |
| 2006/0250280 A1* | 11/2006 | Chen et al. | 340/974 |
| 2008/0231473 A1* | 9/2008 | Wyatt et al. | 340/971 |
| 2009/0265088 A1 | 10/2009 | Dias et al. | |
| 2010/0305783 A1* | 12/2010 | Tucker et al. | 701/4 |

* cited by examiner

*Primary Examiner* — Khoi Tran
*Assistant Examiner* — Robert Nguyen
(74) *Attorney, Agent, or Firm* — Ingrassia Fisher & Lorenz, P.C.

(57) ABSTRACT

An aircraft display system is provided and configured to render a cockpit display having a field-of-view. The system comprises a monitor and a processor coupled to the monitor and configured to generate a vertical situation display on the monitor. The vertical situation display includes at least one graphic indicative of a region of the terrain encompassed by the field-of-view.

15 Claims, 7 Drawing Sheets

SYSTEM AND METHOD FOR INDICATING A PERSPECTIVE COCKPIT FIELD-OF-VIEW ON A VERTICAL SITUATION DISPLAY

FIELD OF THE INVENTION

The present invention relates generally to vehicular display systems, and, more particularly, to an aircraft display system and method for visually representing a cockpit field-of-view on a two dimensional vertical situation display.

BACKGROUND OF THE INVENTION

Aircraft display systems are capable of providing an observer (e.g., a pilot) with a considerable amount of information relating to the aircraft's position, flight plan, and surrounding environment (e.g., nearby geographical features, such as airports and mountains). An aircraft display system typically includes at least one monitor, which may be, for example, a head down display (HDD) screen. A processor utilizes information received from a variety of data sources to generate multiple displays on the monitor. These displays typically include a two-dimensional, horizontal situational awareness, moving map display, a three-dimensional perspective display, and a vertical situation display. The moving map display may include a top-down view of the aircraft, the flight plan, and the surrounding environment, while the perspective display represents the cockpit field-of-view. Various symbols are utilized to denote navigational cues (e.g., waypoint symbols, line segments interconnecting the waypoint symbols, range rings) and nearby environmental features (e.g., terrain, weather conditions, political boundaries, etc.). The perspective display is a forward-looking view, which may be somewhat similar to the view from the cockpit on a clear day. By comparison, the vertical situation display presents a clear graphical profile of the aircraft's vertical flight path that enhances the flight crews' vertical situational awareness by depicting the vertical situation of the aircraft throughout all phases of flights. It provides immediate validation and full time monitoring of the aircraft's flight path.

The moving map display, the perspective display, and vertical situation display each provide a pilot (or other observer) with important navigational information. For example, the moving map display permits a pilot to easily determine the aircraft's location with reference to geographical landmarks, including significant geographical features (e.g. ridges, mountain ranges, valleys, etc.) and man-made structures such as airports. The perspective display provides information regarding the aircraft's orientation (e.g. altitude, attitude, pitch, roll, etc.) and aspects of nearby geographical features in an intuitive manner. The moving map display and the vertical situation display may be produced on one or more monitors. For example, the moving map display and vertical situation display may be produced simultaneously on a single screen in a split-screen or picture-in-picture format. However, even when the displays are produced simultaneously on a single monitor, an observer may have difficulty correlating (i.e., associating) the information provided by the moving map display and with that provided by the vertical situation display. The observer may be unable to correlate the moving map display with the vertical situation display because conventional vertical situation display systems do not identify, on the vertical situation display, the cockpit field-of-view. Thus, the pilot's vertical situational awareness does not include visual cues regarding objects falling within the cockpit field-of-view and that outside the cockpit field-of-view on the vertical situation display.

Considering the foregoing, it would be desirable to provide an aircraft display system and method for indicating one or more parameters of the cockpit field-of-view on a vertical situation display in an intuitive and readily-comprehensible manner. Furthermore, other desirable features and characteristics of the present invention will become apparent from the subsequent detailed description of the invention and the appended claims, taken in conjunction with the accompanying drawings and this background of the invention.

BRIEF SUMMARY OF THE INVENTION

An aircraft display system is provided on board an aircraft and is configured to render a cockpit field-of-view. The system comprises a monitor and a processor coupled to the monitor and configured to generate a vertical situation display on the monitor, the vertical situation display including at least one graphic indicative of the region of terrain encompassed by the field-of-view.

A method is also provided for correlating a cockpit field-of-view with a moving-map vertical situation display on an aircraft. The method comprises identifying a first location at which the proximal end of the field-of-view intersects ground level and displaying a first marker visually representative of the first location on the vertical situation display.

Further, an aircraft display system configured to render a display having a field-of-view is provided. The display system comprises a monitor and a processor coupled to the monitor and configured to (a) generate a vertical situation display on the monitor, (b) generate a first graphic for display on the vertical situation display at the proximal end of the field-of-view at ground level, and (c) generate a second graphic for display on the vertical situation display at the distal end of the field-of-view at ground level.

BRIEF DESCRIPTION OF THE DRAWINGS

The present invention will hereinafter be described in conjunction with the following drawing figures, wherein like numerals denote like elements, and.

DETAILED DESCRIPTION OF AT LEAST ONE EXEMPLARY EMBODIMENT

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
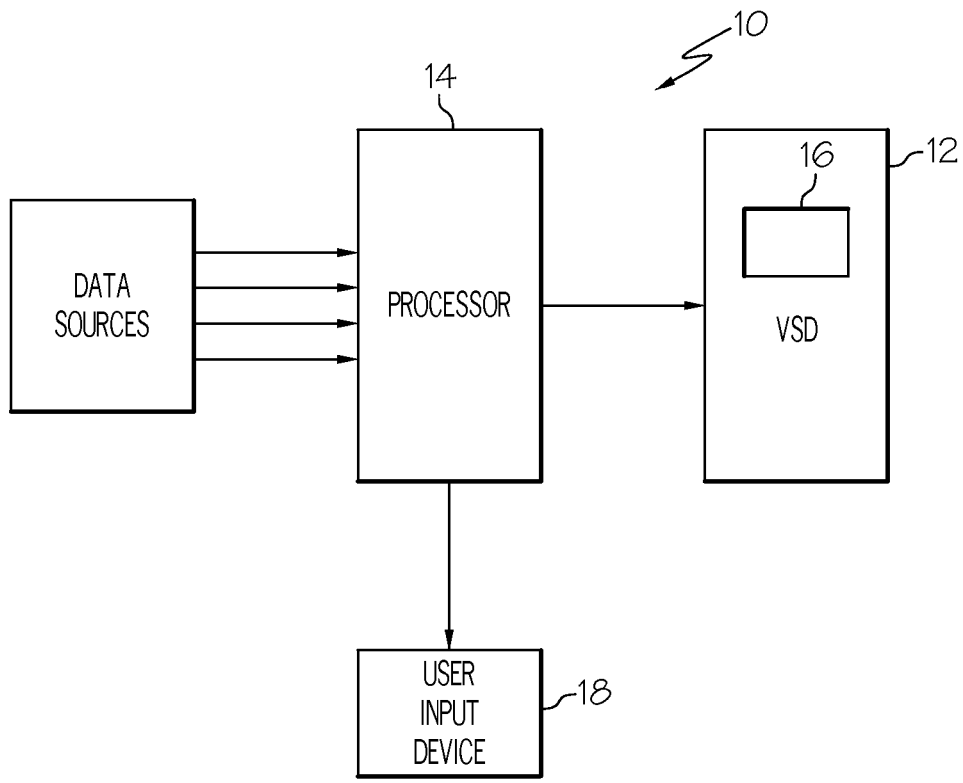
FIG. 1 is a block diagram of an aircraft display system in accordance with an exemplary embodiment of the present invention.

FIG. 1 is a functional block diagram of a generalized avionics display system 10. Display system 10 includes at least one monitor 12 having a display 16, a processor 14, and data sources 19. In certain embodiments, display system 10 may also include a user input 18, such as a keyboard and/or a cursor control device (e.g., a trackball). Processor 14 includes a plurality of inputs, which are operatively coupled to data sources 19, and to input device 18, respectively. Processor 14 further includes at least one output, which is operatively coupled to monitor 12. Monitor 12 may comprise any suitable image-generating device including various analog devices (e.g., cathode ray tube) and digital devices (e.g., liquid crystal, active matrix, plasma, etc.). Processor 14 may comprise, or be associated with, any suitable number of individual microprocessors, flight control computers, navigational equipment, memories, power supplies, storage devices, interface cards, and other standard components known in the art. In this respect, the processor 14 may include or cooperate with any number of software programs (e.g., avionics display programs) or instructions designed to carry out the various methods, process tasks, calculations, and control/display functions described below.

Data sources 19 provide static and/or real-time information to processor 14, which processor 14 utilizes to generate one or more displays on monitor 12. Data sources 19 may include a wide variety of informational systems, which may reside onboard the aircraft or at a remote location. By way of example, data sources 19 may include one or more of the following systems: a runaway awareness and advisory system, an instrument landing system, a flight director system, a weather data system, a terrain avoidance and warning system, a traffic and collision avoidance system, a terrain database, a navigational database, an altitude sensor, aircraft specific data, and a synthetic vision system. Data sources 19 may also include mode, position, and/or detection elements (e.g., gyroscopes, global positioning systems, inertial reference systems, etc.) capable of determining the mode and/or position of the aircraft relative to one or more reference locations, points, planes, or navigation aids. More specifically, processor 14 receives altitude above ground data from an altitude sensor, aircraft-specific vertical boresight angle, pitch angle from an inertial reference system, and view depth from a synthetic vision system.

Figure 2:
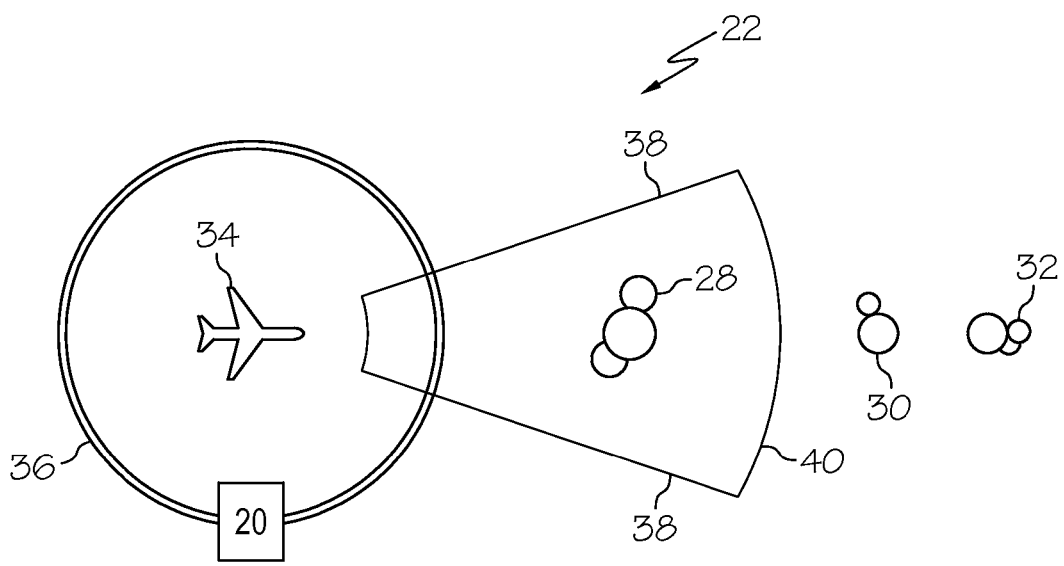
FIG. 2 illustrates a conventional top-down cockpit display having a field-of-view.

FIG. 2 illustrates a horizontal situational awareness, moving map display 22 that includes symbology indicating the location of obstacles 28, 30, and 32 relative to the location of the aircraft, which may be represented by a top-down aircraft symbol 34. To provide the pilot with a sense of distance, map display 22 includes at least one range ring 36, which is centered about aircraft symbol 34 and which has a predetermined radius (e.g., twenty nautical miles).

Moving map display 22 provides a pilot (or other observer) with valuable information regarding the aircraft's position, flight plan, and surrounding environment. However, as explained previously, it may be difficult for a pilot to correlate the field-of-view of display 22 with reference to a vertical situation display. For the sake of explanation, both the field-of-view angle and the field-of-view range are shown in FIG. 2 wherein first and second wedges lines 38 indicate the lateral boundaries of the display field-of-view. As can be seen, wedge lines 38 converge toward the cockpit, and thus the pilot's viewpoint. In so doing, wedges lines 38 form an angle 40 that substantially corresponds to the field-of-view angle. In addition, the angle of wedge lines 38 may indicate field-of-view range. For example, if the field-of-view range were reduced (e.g., partially blocked) by nearby terrain, the length of wedge lines 38 may be shortened accordingly. The length of wedge lines 38 may vary to indicate a change in the pitch angle of the aircraft. For example, as the pitch angle increases (i.e. pitching up) wedge lines 38 will increase in length, and vice-versa. This example notwithstanding, it should be understood that alternative embodiments of the avionics display system may be configured to produce other graphics (e.g., a numeric indicator on moving map display 22 indicative of the field-of-view angle and/or the field-of-view range. A range ring 36 (e.g. twenty nautical miles) is also shown around aircraft 34.

In addition to horizontal moving map display 22, processor 14 (FIG. 1) may also generate a two dimensional moving map vertical situation display 42 (FIG. 3) on monitor 12. Processor 14 preferably generates the horizontal display and the vertical situation display simultaneously on monitor 12, although this may not always be the case. For example, horizontal display 22 may be displayed in a first window, which may occupy a majority of monitor 12 (e.g., two thirds of the monitor), and the vertical situation display 42 may be displayed in a second, smaller window. Alternatively, the horizontal display may occupy the entirety of monitor 12 and the vertical situation display may be produced in a small window superimposed over a portion of the vertical situation display (commonly referred to as a picture-in-picture format).

Figure 3:
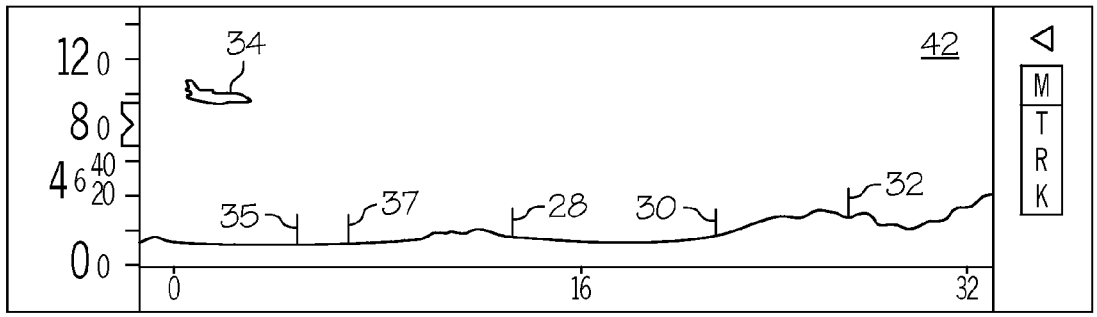
FIG. 3 illustrates a moving map vertical situation display in accordance with the prior art.

The vertical situation display 42 shown in FIG. 3 provides a pilot (or other observer) with valuable information regarding the aircraft's position, flight plan, and surrounding environment. However, as explained previously, it may be difficult for a pilot to determine the field-of-view of moving map display 22 with reference to the vertical situation display shown in FIG. 3. To permit a pilot to more easily correlate display 22 with vertical situation display 42, processor 14 is configured to generate at least one symbol or graphic on vertical situation display 22 indicative of the value of one or more parameters of the horizontal moving map display 22. These parameters may include, but are not limited to, a proximal field-of-view graphic, a distal field-of-view graphic, and an edge of sky graphic.

FIG. 3 illustrates a vertical situation display associated with the top-down moving map display 22 of FIG. 2 discussed above. As can be seen, there are three obstacle symbols (e.g. mountain ranges) 28, 30, and 32 shown in FIG. 2; however, only graphics 28 falls within the field-of-view of aircraft 34 as is shown in FIG. 2. Referring now to FIG. 3, it can be seen that the vertical situation display of the terrain shown in FIG. 2, in accordance with the prior art, displays obstacles 28, 30, and 32 and additional obstacles 35 and 37, but gives no indication as to which obstacles fall within the field-of-view of aircraft 34.

Figure 4:
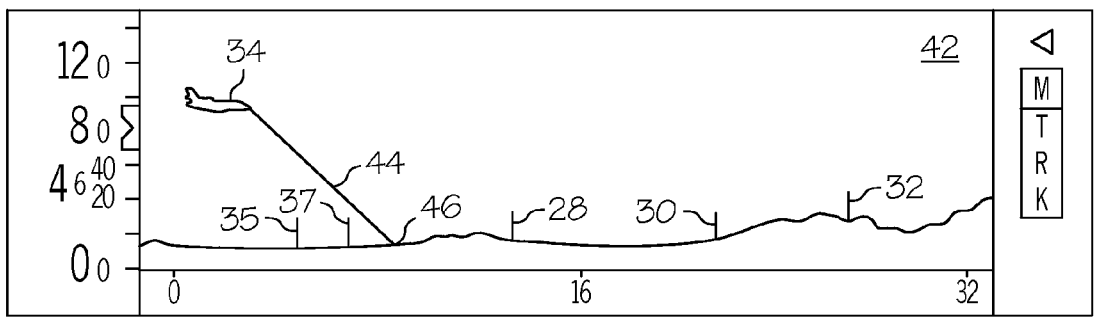
FIG. 4 illustrates a moving map vertical situation display in accordance with a first exemplary embodiment.

In accordance with an embodiment, processor 14 (FIG. 1) is configured to utilize data previously described (e.g. aircraft pitch angle, altitude, vertical boresight angle, and view depth) to determine at least one parameter associated with the terrain in the cockpit field-of-view of aircraft 34 and generate symbology data for transmission to monitor 12 causing a visual representation (e.g. symbol, graphic, marker, etc.) of the parameter to be shown on display 16 of monitor 12. In the embodiment shown in FIG. 4, the parameter corresponds to the location of the proximal edge 46 of terrain in the cockpit field-of-view, which is visually represented by a line 44 from aircraft symbol 34 to the field-of-view proximal edge 46 at ground level.

Figure 5:
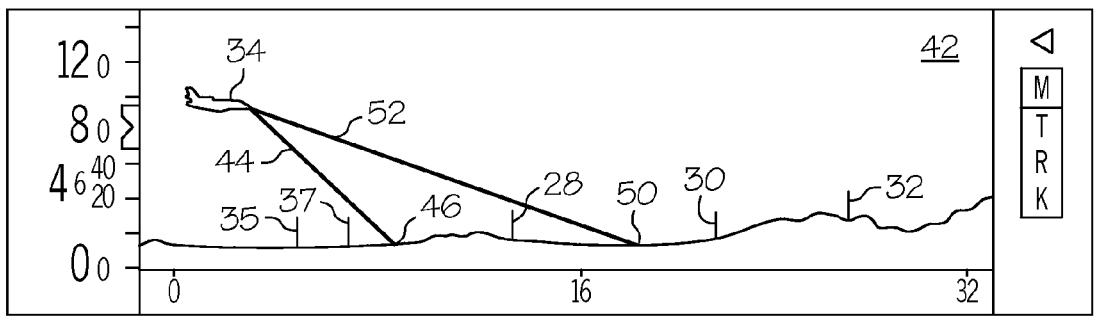
FIG. 5 illustrates a moving map vertical situation display in accordance with a second exemplary embodiment.
Figure 6:
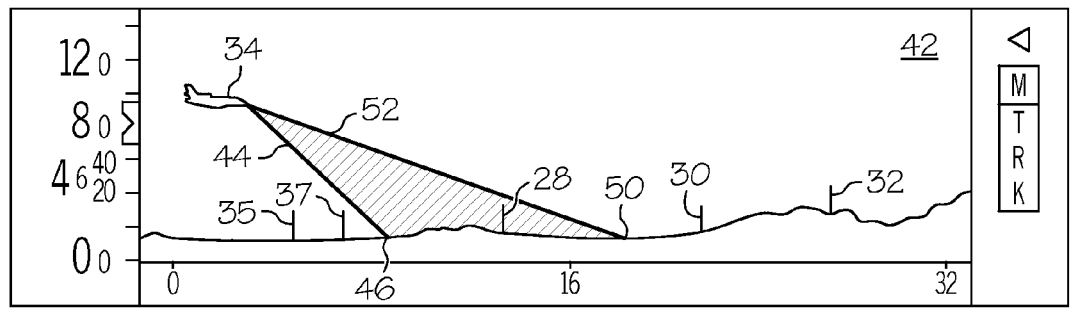
FIG. 6 illustrates the vertical situation display of FIG. 5 wherein the field-of-view is shaded.
Figure 7:
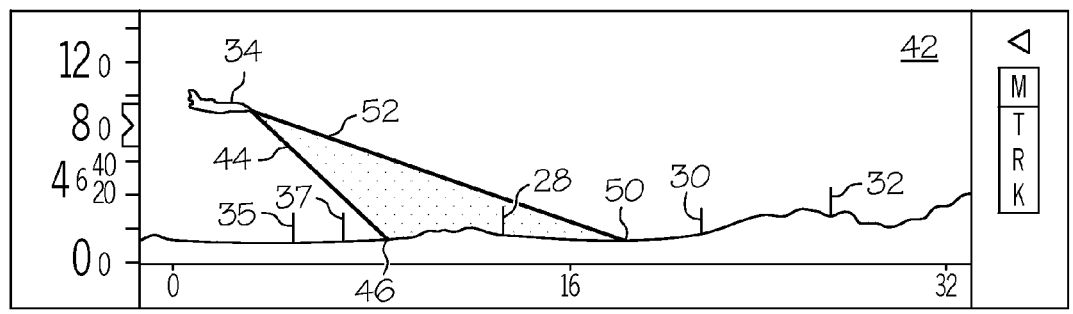
FIG. 7 illustrates the vertical situation display of FIG. 5 wherein the field-of-view is stippled.

In another embodiment, processor 14 generates symbology data for transmission to monitor 12 to cause a visual representation of a second parameter to be generated on display 16. In FIG. 5, the second parameter corresponds to the location of the distal edge 50 of the terrain in the cockpit field-of-view and is represented by a second line 52 extending from aircraft symbol 34 to distal edge 50 proximate ground level. Thus, by viewing a vertical situation display as shown in FIG. 5, a pilot or other observer can readily discern that only the obstacle represented by symbol 28 is within the terrain encompassed by the cockpit field-of-view. The region between lines 44 and 52 can be displayed more prominently by shading as shown in FIG. 6, stippling as shown in FIG. 7, coloring, etc.

Figure 8:
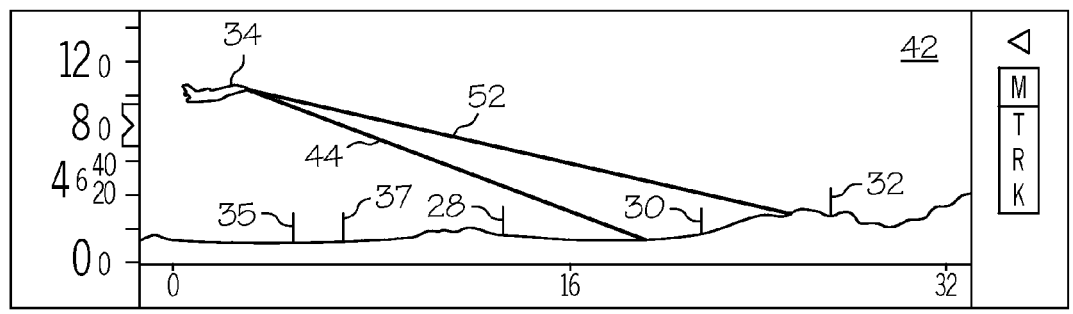
FIG. 8 illustrates a moving map vertical situation display showing the field-of-view for an aircraft that is pitched upward.
Figure 9:
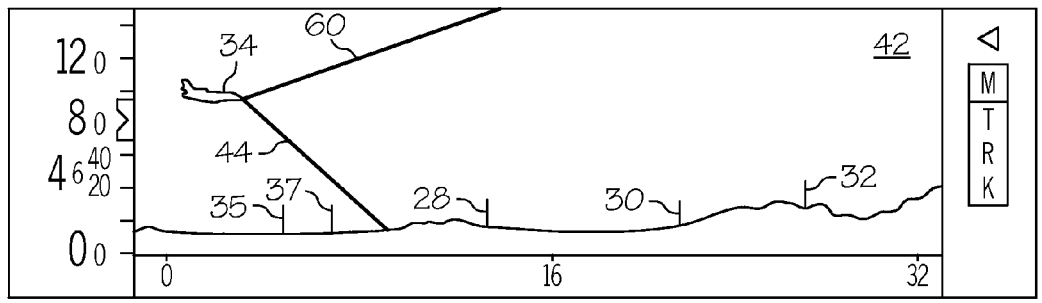
FIG. 9 illustrates a moving map vertical situation display in accordance with a third exemplary embodiment.
Figure 10:
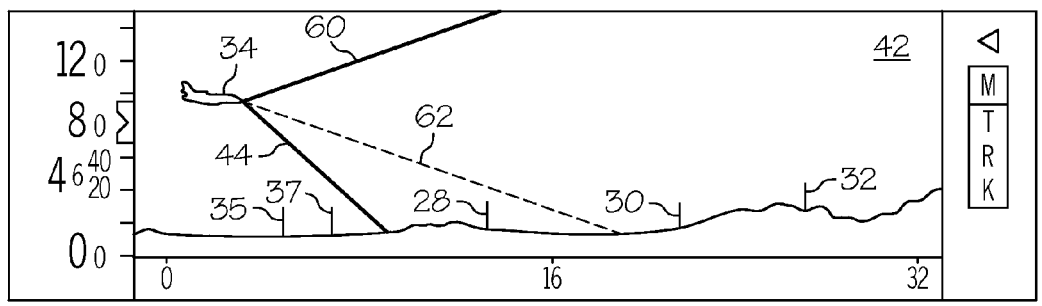
FIG. 10 illustrates a moving map vertical situation display in accordance with a fourth exemplary embodiment.

Referring to FIG. 8, aircraft 34 has pitched upward causing the field-of-view to move forward. In this case, symbol 30 visually represents an obstacle within the proximal and distal edge of terrain in the cockpit field-of-view while the obstacle represented by graphic 28 is no longer in the field-of-view. Referring to FIG. 9, line 44 represents the proximal end of the field-of-view on the perspective display or the horizontal moving map display, and line 60 extending from aircraft symbol 34 indicates the start-of-sky. To provide the pilot with even greater situational awareness, a third thin dotted/dashed line 62 may be generated on the vertical situation display and visually represents the distal end of the field-of-view as shown in FIG. 10.

Figure 11:
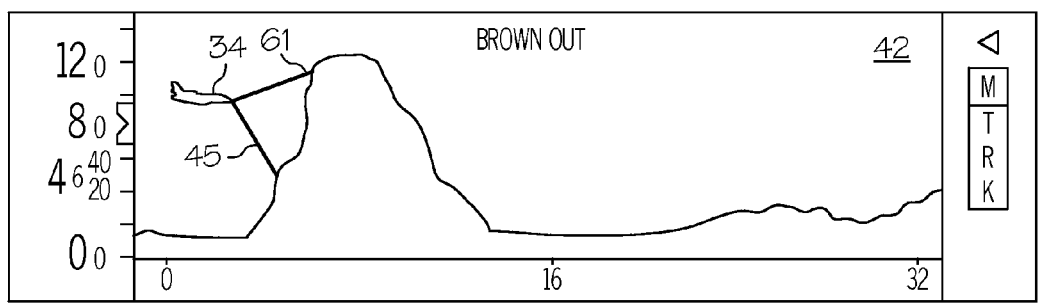
FIG. 11 illustrates a moving map vertical situation display illustrating a brown-out scenario.
Figure 12:
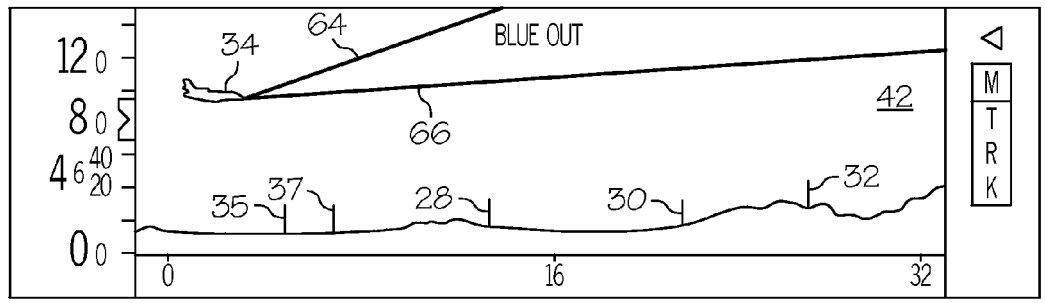
FIG. 12 illustrates a moving map vertical situation display illustrating a blue-out scenario.

FIG. 11 illustrates how a "brown-over-brown" or "brown-out" condition may be represented on vertical situation display in accordance with a further embodiment. A brown-out condition occurs when a pilot sees terrain both above and below the horizontal line of the perspective display as indicated by lines 45 and 61. In contrast, FIG. 12 illustrates a "blue-over-blue" or "blue-out" condition that occurs when the aircraft is pitching up excessively such that no terrain is visible on the perspective display as indicated by lines 64 and 66. The graphical representation of a brown-out or blue-out condition on the vertical situation display assists a pilot in knowing (1) how much pitch-up is required to correct the brown-out, and (2) how much pitch-down is required to correct the blue-out.

Figure 13:
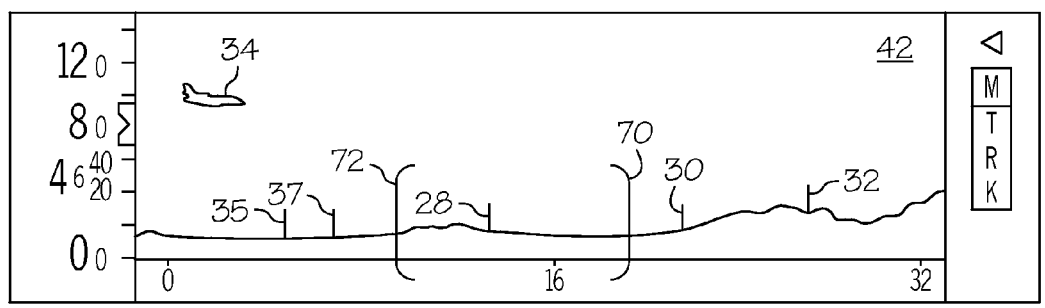
FIG. 13 illustrates a moving map vertical situation display in accordance with a fifth exemplary embodiment.
Figure 14:
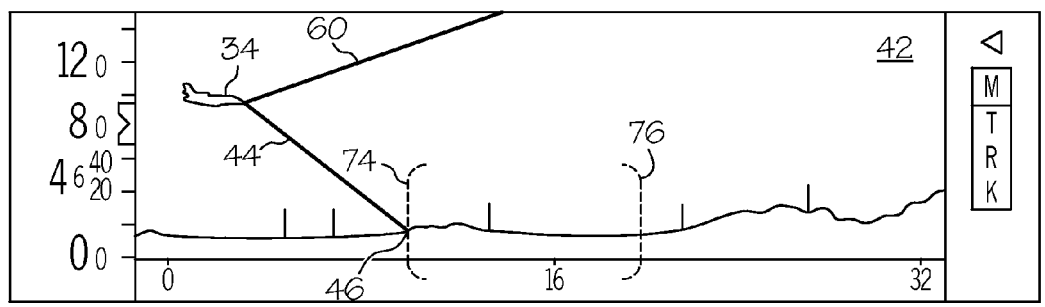
FIG. 14 illustrates a moving map vertical situation display in accordance with a fifth exemplary embodiment.

In a preferred embodiment, the distal edge 50 and proximal edge 46 of the field-of-view are visually represented by bracket symbols 70 and 72, respectively, as is shown in FIG. 13. That is, processor 14 generates the symbology data that is transmitted to monitor 12 and results in the display of brackets 70 and 72 at the proximal and distal edges, respectively, of the field-of-view on display 16. It should be noted that indicator lines and brackets may be combined to increase a pilot's situational awareness. For example, in FIG. 14, line 44 extends from aircraft 34 to the proximal end of the field-of-view 46, and line 60 indicates the start of sky as was the case in FIG. 9. Stippled brackets 74 and 76 are added to more clearly visually represent the proximal and distal ends of the field of view.

Figure 15:
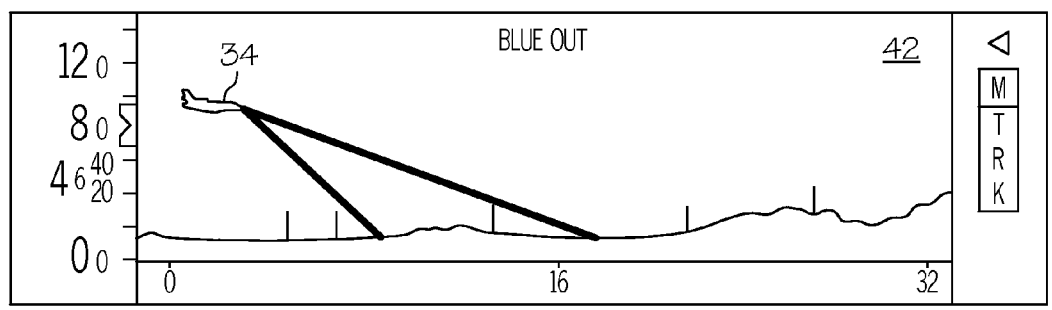
FIG. 15 illustrates a moving map vertical situation display in accordance with a sixth exemplary embodiment.
Figure 16:
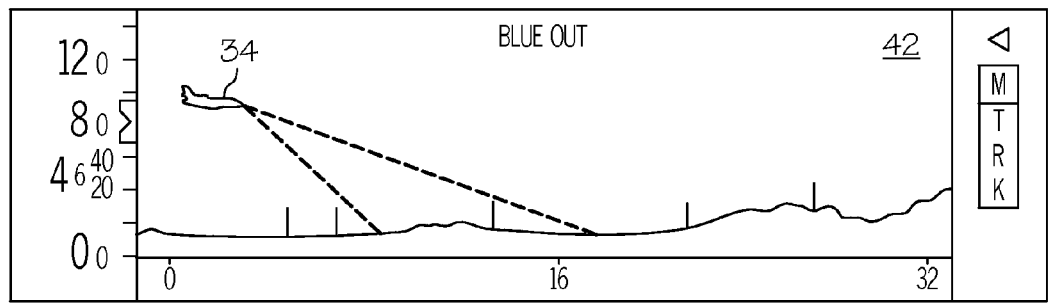
FIG. 16 illustrates a moving map vertical situation display in accordance with a seventh exemplary embodiment.

It should be clear that other symbology can be generated to clearly identify the field-of-view in accordance with the foregoing. For example, the field-of-view lines may be solid as shown in FIG. 5, dashed and/or dotted as shown in FIG. 15, or thick and/or shaded as shown in FIG. 16. The area between the field-of-view lines may be shaded or stippled as shown in FIGS. 6 and 7 respectfully. It should also be clear that brackets 70 and 72, lines 44 and 52, or any similar visual representations of the cockpit field-of-view may have any desired dimensions or thickness so long as they are easily discernable on the vertical situation display to the pilot or other observer. Furthermore, the lines, brackets, or other graphical representations of the field-of-view on the vertical simulation display may be shaded, solid, stippled, dotted, dashed or the like. It should also be noted that the lines or brackets delineating the field-of-view are relative to the nose of the aircraft. Therefore, if the aircraft symbol moves on the vertical situation display, the lines and/or brackets will move with the aircraft.

Figure 17:
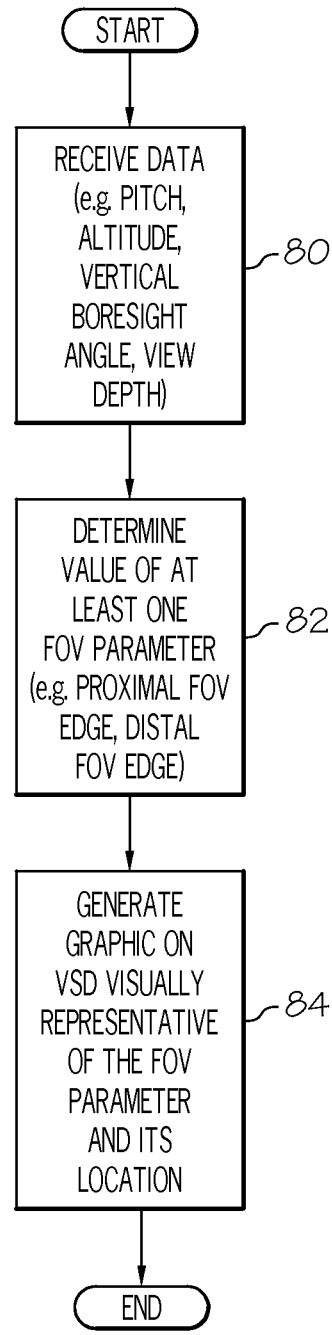
FIG. 17 is a flowchart illustrating an exemplary process that may be performed by the processor shown in FIG. 1 for generating the field-of-view graphics of FIGS. 4-16.

FIG. 17 is a flow chart illustrating an exemplary method that may be carried out by processor 14 (FIG. 2) to generate field-of-view symbology on monitor 12 (FIG. 1). To commence, (STEP 80), processor 14 receives data indicating the altitude, pitch, view depth, and vertical bore sight angle of the aircraft (STEP 80). Next, in STEP 82, processor 14 determines the value of at least one field-of-view parameter. Finally, in STEP 84, processor 14 generates symbology on display 16 visually representative of the field-of-view parameter; e.g. proximal edge, distal edge, etc.

It should thus be appreciated that there has been provided an aircraft display system and method for indicating at least one parameter of cockpit field-of-view display on a two dimensional vertical situation display in an intuitive and readily-comprehendible manner. While an exemplary embodiment of the present invention has been described above in the context of a fully functioning computer system (i.e., avionics display system 10), those skilled in the art will recognize that the mechanisms of the present invention are capable of being distributed as a program product (i.e., an avionics display program) and, furthermore, that the teachings of the present invention apply to the program product regardless of the particular type of computer-readable media (e.g., floppy disc, hard drive, memory card, optical disc, etc.) employed to carry-out its distribution.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. For example, while the embodiments are described in connection with displaying the proximal and distal edges of the field-of-view on a vertical situation display, the systems and methods describes herein are equally applicable to other field-of-view parameters. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An aircraft display system configured to render a cockpit display having a cockpit field-of-view, comprising:
   a monitor; and
   a processor coupled to the monitor and configured to generate a vertical situation display on the monitor, the vertical situation display including at least one marker symbol at a first location and indicative of a region of terrain encompassed by the cockpit field-of-view, wherein the first marker symbol comprises a first bracket indicative of the proximal end of the cockpit field-of-view proximate ground level.

2. The aircraft display system according to claim 1, wherein the vertical situation display includes an aircraft graphic and wherein the first marker symbol comprises a first line extending from the aircraft symbol to the first location.

3. The aircraft display system according to claim 1, wherein the processor is further configured to generate a second marker symbol indicative of a second location at which the cockpit field-of-view is proximate ground level.

4. The aircraft display system according to claim 3, wherein the second location comprises the distal end of the cockpit field-of-view proximate ground level.

5. The aircraft display system according to claim 4, wherein the second marker symbol comprises a second bracket.

6. The aircraft display system according to claim 4, wherein the second marker symbol comprises a first line extending from the aircraft.

7. The aircraft display system according to claim 4, wherein the terrain between the first location and the second location is within the cockpit field-of-view at ground level.

8. The aircraft display system according to claim 6, further comprising a second line extending from the aircraft symbol to a second location, wherein the area between the first line and the second line on the display is shaded.

9. The aircraft display system according to claim 2, further comprising a second line extending from the aircraft symbol to a second location, wherein the area between the first line and the second line on the display is colored.

10. The aircraft display system according to claim 2, further comprising a second line extending from the aircraft symbol to a second location, wherein the area between the first line and the second line on the display is stippled.

11. A method for correlating a perspective display having a cockpit field-of-view with a moving-map vertical situation display of an aircraft the method comprising:
    identifying a first location at which the proximal end of the cockpit field-of-view intersects ground level;
    displaying a first graphic visually representative of the first location on the vertical situation display;
    identifying a second location at which the distal end of the cockpit field-of-view intersects ground level; and
    displaying a second graphic visually representative of the second location on the vertical situation display.

12. The method according to claim 11, wherein the steps of displaying a first graphic and a second graphic comprise displaying first and second brackets, respectively, that identify the cockpit field-of-view.

13. The method according to claim 11, wherein the steps of displaying a first graphic and a second graphic comprise displaying first and second lines extending from an aircraft symbol to the first and second locations, respectively, on the vertical situation display.

14. The method according to claim 13, further comprising highlighting an area between the first and second lines.

15. An aircraft display system configured to render a perspective display having a cockpit field-of-view, comprising:
    a monitor; and
    a processor coupled to the monitor and configured to (a) identify a first location at which the proximal end of the cockpit field-of-view intersects ground level; (b) display a first graphic visually representative of the first location on the vertical situation display; (c) identify a second location at which the distal end of the cockpit field-of-view intersects ground level; and (d) display a second graphic visually representative of the second location on the vertical situation display.

* * * * *